(12) United States Patent
Lathrop et al.

(10) Patent No.: US 9,031,729 B2
(45) Date of Patent: May 12, 2015

(54) METHOD AND SYSTEM FOR CONTROLLING A VEHICLE

(71) Applicant: Volkswagen AG, Wolfsburg (DE)

(72) Inventors: William Brian Lathrop, San Jose, CA (US); Erik Glaser, San Francisco, CA (US); Nathaniel Coser, Palo Alto, CA (US); Bryan Grant, Palo Alto, CA (US); James Toggweiler, San Francisco, CA (US)

(73) Assignee: Volkswagen AG (DE)

( * ) Notice: Subject to any disclaimer, the term of this patent is extended or adjusted under 35 U.S.C. 154(b) by 0 days.

(21) Appl. No.: 13/689,080

(22) Filed: Nov. 29, 2012

(65) Prior Publication Data
US 2014/0148988 A1    May 29, 2014

(51) Int. Cl.
*G01C 22/00* (2006.01)
*B60W 30/182* (2012.01)
*B60W 50/10* (2012.01)
*B60W 50/14* (2012.01)
*B60W 50/00* (2006.01)

(52) U.S. Cl.
CPC ............ *B60W 30/182* (2013.01); *B60W 50/10* (2013.01); *B60W 50/14* (2013.01); *B60W 2050/0095* (2013.01); *B60W 2540/22* (2013.01); *B60W 2540/30* (2013.01)

(58) Field of Classification Search
None
See application file for complete search history.

(56) References Cited

U.S. PATENT DOCUMENTS

| | | | |
|---|---|---|---|
| 8,258,934 B2 * | 9/2012 | Filev et al. | 340/435 |
| 8,260,482 B1 | 9/2012 | Szybalski et al. | |
| 2006/0187305 A1 * | 8/2006 | Trivedi et al. | 348/169 |
| 2009/0138155 A1 * | 5/2009 | Wakiyama et al. | 701/36 |
| 2009/0287367 A1 | 11/2009 | Salinger | |
| 2010/0030434 A1 * | 2/2010 | Okabe et al. | 701/48 |
| 2010/0033333 A1 * | 2/2010 | Victor et al. | 340/576 |
| 2011/0102166 A1 * | 5/2011 | Filev et al. | 340/435 |
| 2012/0277955 A1 * | 11/2012 | Irie | 701/41 |

OTHER PUBLICATIONS

Search Report for German Patent Application No. 10 2013 224 118.6; Sep. 5, 2014.

* cited by examiner

*Primary Examiner* — Adam Alharbi
(74) *Attorney, Agent, or Firm* — Barnes & Thornburg LLP

(57) ABSTRACT

A method for controlling a vehicle which includes obtaining, via at least one detecting device, behavior information of a driver in the vehicle, and transitioning control statuses of the vehicle according to the driver behavior information.

19 Claims, 4 Drawing Sheets

METHOD AND SYSTEM FOR CONTROLLING A VEHICLE

FIELD

Disclosed embodiments relate to automotive vehicles, and more particularly to a method and a vehicle system for controlling the automotive vehicle, and a vehicle with the vehicle system.

BACKGROUND

The operation of modern automotive vehicles is becoming more autonomous, such as being able to provide control with less and less driver intervention. Autonomous driving vehicles historically have been defined as driverless robotic machines capable of operating in a variety of environments and driving situations without intervention, input, or assistance from a human operator. At autonomous driving status, the vehicle is driving itself with sensors obtaining surrounding information and control devices which operate longitudinal and lateral driving of the vehicle. The most recent advancements in this area have come from the Defense Advanced Research Projects Agency (DARPA), which has supported a variety of competitions designed to further the state of robotic technology for special applications.

Generally autonomous vehicle technology is called a driver assistance system (DAS) or advanced driver assistance system (ADAS). These systems assist the driver in decision and control, but inevitably the decisions and control are the responsibility of the driver. Further, these systems can be either "active" or "passive" in how they are implemented. Active DAS means that the vehicle itself controls various longitudinal and/or lateral aspects of the vehicle's driving behavior, or rather, very specific driving tasks, through its sensors, algorithms, processing systems, and actuators. Passive DAS means that the vehicle will simply assist the driver, through its sensors, algorithms, processing systems, and human-machine interfaces (HMIs) with controlling various longitudinal and/or lateral aspects of vehicle control. For example, in a collision avoidance situation an active system would bring the vehicle to a stop or route the vehicle around the obstacle in the immediate path. A passive system would provide some type of visual, auditory, and haptic cues to the driver to stop or route the vehicle around the obstacle.

As stated above, DAS system helps the driver with many tasks ingrained into the driving process and implemented specifically for the purpose to increase car and road safety, as well as driver convenience. Such DAS systems include, but not limit to cruise control, adaptive cruise control (ACC), active steering for lane keeping, lane change assistance, highway merge assistance, collision mitigation and avoidance systems, pedestrian protection systems, automated and/or assistive parking, sign recognition, blind spot detection for collision mitigation, and stop and go traffic assistance.

FIGS. 1a and 1b is a partially perspective view of a steering wheel having a cruise control interface in vehicles of the prior art. Different variants of cruise control HMI are used by different manufacturers. As shown in FIG. 1a, there are some control buttons at the left side of the steering wheel. These buttons include On/Off, Set+, Set−, and Resume for purposes of activating the system, increasing speed, decreasing speed, and resuming cruise control, respectively. In FIG. 1b, the control buttons are at the right side of the steering wheel, These buttons include On/Off, Cancel, Res/Accel, and Coast/Set for purposes of activating the system, cancelling the activation of the system, resuming cruise control/increasing speed, and coasting/setting cruise control, respectively. The resulting impact of deployment of different DAS HMI is that the controls are often difficult to understand and to use. Further, all of these systems are used in an explicit manner, requiring the driver to make deliberate knowledge-based decisions and behaviors in order to operate the system (i.e., explicit control schemes).

In addition, even a vehicle that can drive autonomously in all types of driving situations, it still needs to be able to facilitate a seamless, intuitive transitioning of control immediately with little effort on the part of the driver. Autonomously driving means that a vehicle is driving itself with sensors obtaining information of the surrounding and sensors with actuators which operate the longitudinal driving and the lateral driving of the car without any driver operation. A computer coordinates all the information and the operations. This driving situation is also called autonomous control status. When the driver controls the car at all without any longitudinal and/or transversal assistance of the car it is called driver control status. The semi autonomous status is when the driver is supported by at least one driving assistance system, e.g. the driver uses the steering and the vehicle takes care for the longitudinal driving by braking or accelerating.

Most of the known prior art on this subject matter of HMIs for DAS is similar to that shown for cruise control examples in FIGS. 1a and 1b. In order to change the driving status of the vehicle, regardless of the level or number of DAS available, the driver makes an explicit engagement of the system, e.g., pushes a button, turns a knob, slides a switch, or uses some type of verbal command.

US patent application 2009/0287367 A1 describes a method and apparatus for driver control of a Limited-Ability Autonomous Vehicle. It focuses on how a driver might control a vehicle equipped with the necessary technologies required for more or less complete autonomous driving. The vehicle incorporates the necessary sensor technology (e.g., cameras, Lidar, etc.), navigation technology (e.g., road and traffic assessment modules), driver monitoring, navigation planning, toward and lateral motion supervisors, and lastly a driver command processor.

The US patent application proposes a type of keyboard, touchpad, or joystick for purposes of commanding the vehicle to perform maneuvers during both low and high speed driving conditions and situations. The key aspect of this patent application is the manner in which this communication takes place, and the communication type is defined as explicit. For instance, the commands communicated to the autonomous vehicle require a specific button press, touchscreen element activation, or joystick movement for purpose of communicating a specific action or maneuver for the vehicle to perform. In essence, the commands for a status change (i.e., driver control-to-autonomous control) are explicitly communicated to the vehicle via the various proposed interface devices.

It is desirable to come up with an improved controlling type between the driver and the vehicle, so as to implement the autonomous driving seamlessly and effectively.

SUMMARY

Disclosed embodiments relate not only to the autonomous vehicle itself, but they are also a solution that would be used to control such an autonomous vehicle. Disclosed embodiments provide control scheme for semi-autonomous vehicles wherein driving status change are performed not explicitly, and controlled via observation of the driver's behavior. The change from a driving status like from autonomous driving status to semi-autonomous status is also called a transition for purposes of the disclosed embodiments. The level of control or driving task to be performed in an autonomous or non-autonomous status is controlled by what the driver is doing or not doing when seated in the driving position of the vehicle.

BRIEF DESCRIPTION OF THE DRAWINGS

The disclosed embodiments and their features will be explained in detail below in connection with the accompanying drawings.

DETAILED DESCRIPTION OF THE DISCLOSED EMBODIMENTS

Figure 1A:
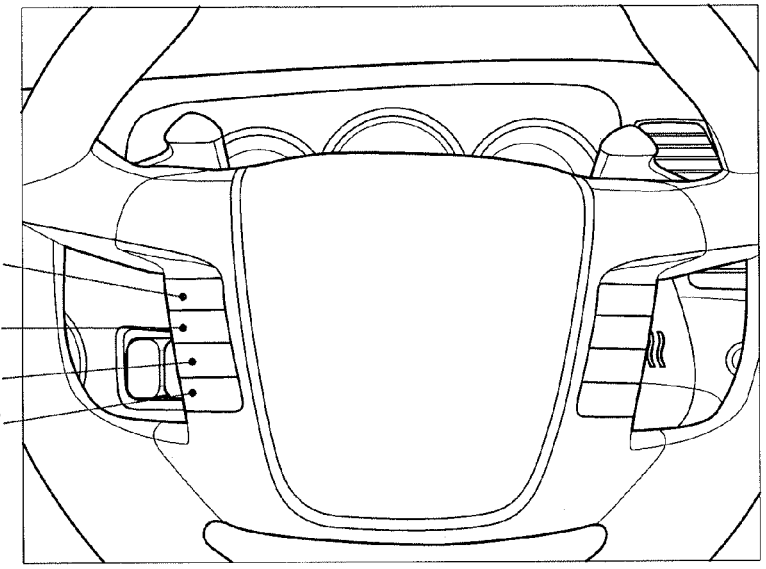
FIGS. 1a and 1b are a partially perspective view of a steering wheel having a cruise control interface in vehicles of the prior art.
Figure 1B:
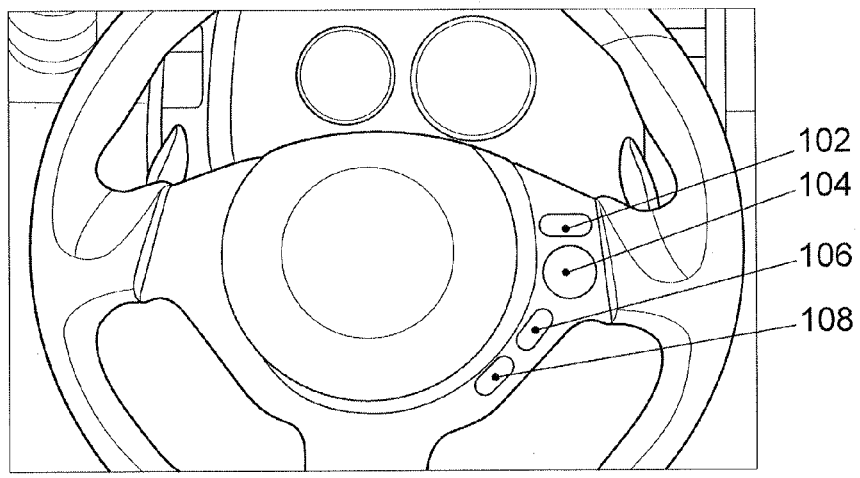

Disclosed embodiments provide a method for controlling a vehicle, comprising obtaining, via at least one detecting device, behavior information of a driver in the vehicle, and transitioning control status of the vehicle according to the driver behavior information.

According to at least one disclosed embodiment, the driver behavior information comprises driver's interaction with the vehicle, and driver's body state in the vehicle. According to a further disclosed embodiment, the control status of the vehicle comprises driver control status, semi-autonomous control status and autonomous control status. According to a further disclosed embodiment, the transitioning of control status comprises controlling at least one vehicle control unit in the vehicle to transit the control status. According to a further disclosed embodiment, video and/or audio information for the different control status is provided to the driver.

According to a further disclosed embodiment, the obtaining of behavior information comprises detecting contact, or no contact between at least one hand of the driver and a steering wheel of the vehicle; detecting contact, or no contact between a foot or a shoe of the driver and a brake or gas pedal surface of the vehicle; detecting whether eyes of the driver are directed toward a forward way of the vehicle. According to a further disclosed embodiment, the transitioning comprises transitioning the vehicle control status according to the combination of the driver behavior information. According to a further disclosed embodiment, the transitioning comprises transitioning the vehicle to an autonomous control status from driver control status, when the eyes of the driver are not directed toward the forward way of the vehicle. According to a further disclosed embodiment, the transitioning comprises transitioning the vehicle to a driver controlling status when the driver behavior information is that the at least one hand of the driver is on the steering wheel, foot or shoe is on brake or gas pedal, and eyes are directed toward the forward way.

Disclosed embodiments also provide a vehicle system in a vehicle for controlling the vehicle status, comprising: at least one detecting device for obtaining behavior information of a driver in the vehicle, and a controlling device for transitioning a control status of the vehicle according to the driver behavior information.

According to at least one disclosed embodiment, the control device comprise a master controller for determining a control message according to the driver behavior information, and at least one vehicle control unit for transitioning the control status according to the control message. According to a further disclosed embodiment, the at least one detecting device is adapted to detect contact, or no contact between at least one hand of the driver and a steering wheel of the vehicle; detect contact, or no contact between a foot or a shoe of the driver and a brake or a gas pedal surface of the vehicle; detect whether eyes of the driver are directed toward the forward way of the vehicle.

According to a further disclosed embodiment, the master controller is adapted to transit the vehicle control status according to the combination of the driver behavior information. According to a further disclosed embodiment, the vehicle system further comprises an infotainment system for providing information for the different status of the system to the driver.

Disclosed embodiments also provide a vehicle comprising the above vehicle system for controlling the vehicle status.

Given the current state of DAS technology and its progression toward vehicles that drive autonomously, disclosed embodiments provide a vehicle control scheme for semi-autonomous vehicles that, at times, will drive in an autonomous status, that is the driver will not control the vehicle, and the vehicle drives using the driver assistance system automatically. And at other times, the vehicle will drive in a driver control status, which means the driver controls the vehicle. It is understood that other driving status can also be created if required, such as semi-autonomous status controlled by the driver and the vehicle together.

Disclosed embodiments relate to the nature in which control statuses are changed, or transitioned by the implicit behaviors and decisions of the driver. The proposed solution for control status transitions in the disclosed embodiments is not an explicit press of a button, turn of a knob, slide of a switch, or some type of explicit verbal communication, but rather, a solution that relies on the observation of driver behavior, or lack thereof, so as to modulate the level of autonomy in which the vehicle is to be operated.

According to at least one disclosed embodiment, the vehicle system comprises a steering wheel sensor, a brake/gas pedal sensor, and an attention engagement sensor used for the purpose of driver behavior observation for subsequent transitions of control status between the driver and the autonomous vehicle. That is, the vehicle system obtains behavior information of the driver in the vehicle via a detecting device, such as the above sensors, and then changes or transitions a control status of the vehicle according to the driver behavior information. Here, the behavior information of the driver is the driver body state information, and comprises driver's body interaction with the vehicle, and driver's body state in the vehicle, for example, whether the driver's hand (hands) has contact with the steering wheel, whether the driver's foot or shoe is on the pedal, or whether the driver's eyes are looking forward during driving. The driver behavior information is not explicit instruction information implemented by the driver, such as pressing a button or making a gesture as an instruction.

In addition, the control status transition of the vehicle includes from autonomous control status to driver control status, from driver control status to autonomous control status, or other control status transition defined as required. Although only two statuses are mentioned in at least one disclosed embodiment, it is understood that any other driving control status of the vehicle can be implemented based on the spirit of the disclosure.

In more concrete terms, the steering wheel has a sensor that can detect no contact, contact, and distance between hand(s) and the steering wheel control surface. The brake/gas pedal mechanism also has a sensor that can detect no contact, contact, and distance between the foot or shoe and the brake/gas pedal control surfaces. In addition, an attention engagement sensor is used to detect whether or not the eyes are directed toward the forward way for purposes of being engaged in the driving task.

Figure 2:
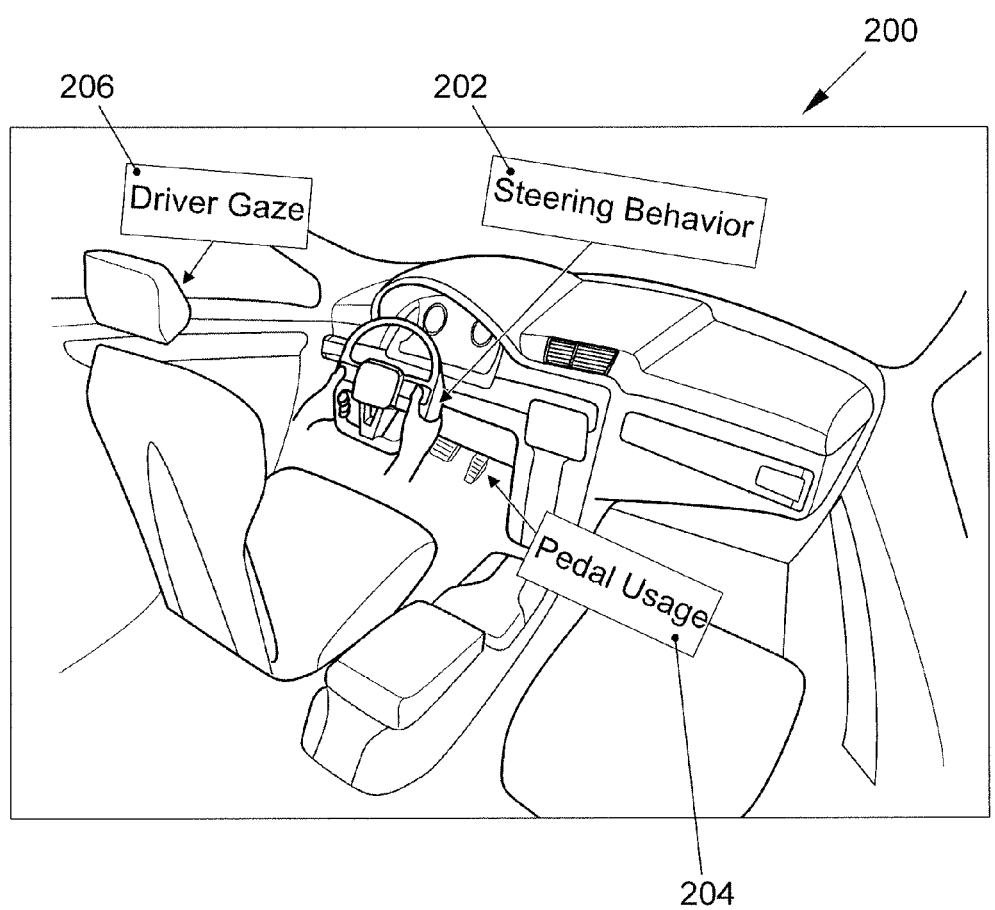
FIG. 2 is a schematic diagram of a sensor system used for a driver behavior observation in the vehicle according to at least one disclosed embodiment.

FIG. 2 is a schematic diagram of a sensor system 200 used for driver behavior information observation in the vehicle according to at least one disclosed embodiment. As shown in FIG. 2, the sensor system 200 includes a wheel rim sensor 202, a foot monitoring camera 204, and a driver monitoring camera 206. The wheel rim sensor 202 is exemplarily integrated into the outer rim of the steering wheel 201, which is used for steering behavior observation so as to detect whether the hand(s) of the driver is in contact with the steering wheel surface and the distance between hand(s) and the steering wheel. The foot or shoe monitoring camera 204 is exemplarily on the driver side footwall of the vehicle, which is used for pedal usage observation so as to detect if the foot or shoe is on the surface of the brake or gas pedal. The driver monitoring camera 206 is exemplarily a camera-based eye and/or head tracking sensor installed on the dashboard, A-pillar, or headliner of the vehicle in front of the driver. The driver monitoring camera 206 is used for driver gaze observation, and can detect whether the driver is directing his attention toward the forward way or not.

It is understood that any number of sensors and any type of sensors or cameras can be used by one skilled in the art to implement the principle of the disclosure.

To realize different embodiments of this system is to use different types of sensors for the detection of different driver behaviors. For example, detection of the hand(s) on the steering wheel can be performed with a pressure sensor, resistive sensor, acoustic wave sensor, camera-based optical sensor, reflective IR sensor, thermal sensor integrated into steering wheel, camera-based thermal sensor, or beam (light or sound)-interruption sensor. Detection of the operational state of the brake/gas pedal can be performed with a pressure sensor, resistive sensor, acoustic wave sensor, camera-based optical sensor, reflective IR sensor, or beam (light or sound)-interruption sensor. In addition, eye and head tracking can be performed with a camera-based optical sensor or a reflective IR sensor.

In another disclosed embodiment of the system, tracking of the hand(s), eyes, and head can be performed with a single camera-based sensor mounted in an appropriate location within the interior of the car. For example, mounting the camera in a location near the front window sun visor would allow a single camera-based sensor device to monitor the current location of the hands (i.e., on or off the steering wheel), as well as the current orientation of the head and gaze direction of the eyes (i.e., directed toward the forward way or directed somewhere else). This information can then be combined with the information from the sensor mounted in the foot area to determine control transitions.

Figure 3:
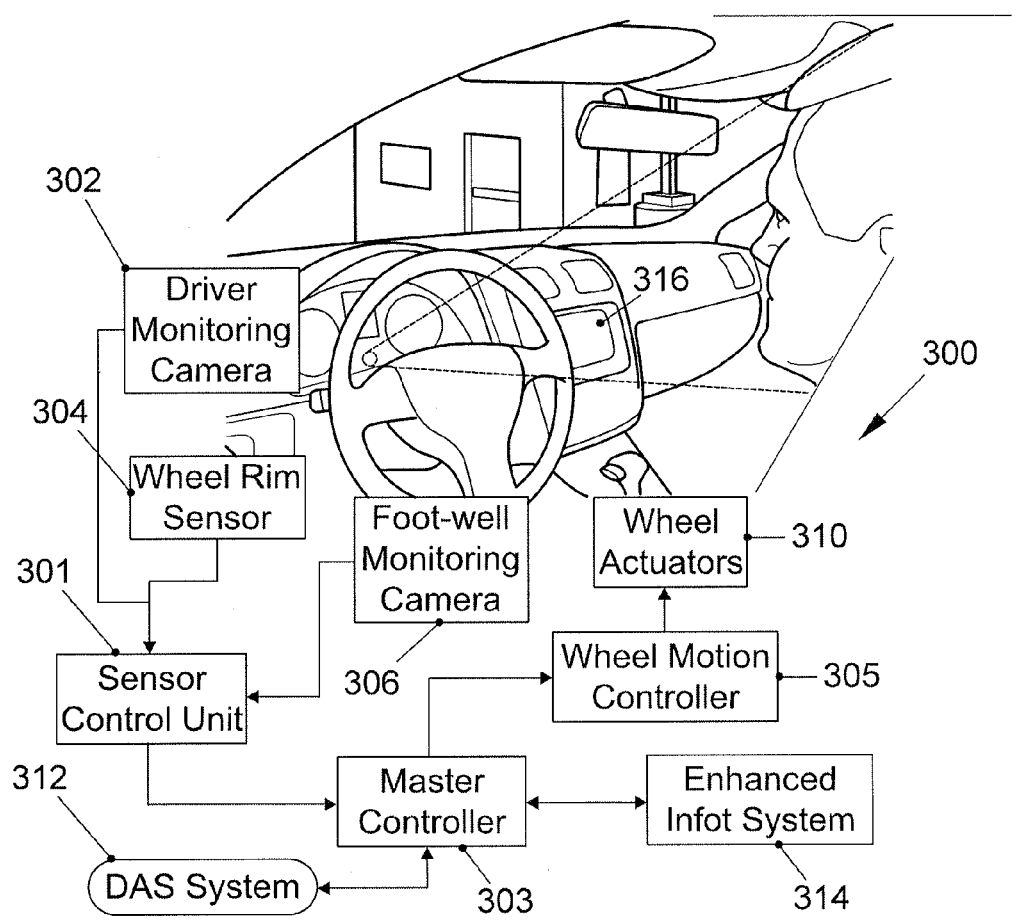
FIG. 3 is a block diagram of the autonomous driving system in the vehicle according to at least one disclosed embodiment.

FIG. 3 is a block diagram of the vehicle driving controlling system 300 in the vehicle according to at least one disclosed embodiment. As shown in FIG. 3, each of the sensors, for example, driver monitoring camera 302, wheel rim sensor 304, and foot monitoring camera 306 is interfaced with a sensor control unit 301, which is a microcontroller that is used for collecting real-time data regarding current state of the hand, foot or shoe, or hand or eye, processing the data, and then creating a message for the current state of the driver body. The message is then sent to a central processing unit, which is the master controller 303 in FIG. 3, on which the data processing program is stored and used for obtaining detected information from the sensor control unit 301, and transmitting a control message to at least one vehicle control unit in the vehicle, and controlling the at least one vehicle control unit to transit the controlling status. According to at least one disclosed embodiment, the vehicle control unit comprises wheel motion controller 305, wheel actuator 310 and DAS system 312.

In order to control the steering wheel's movement during autonomous status, the steering wheel is linked to a gearing system and the wheel actuator 310, which is interfaced with and controlled by the wheel motion controller 305. The wheel motion controller 305 is used to control the specified angle of rotation that the steering wheel should be at. According to another disclosed embodiment, the wheel motion controller 305 can be a part of a DAS system 312, and the DAS system 312 is used for the controlling of speed and wheel steering turning maneuvers of the vehicle.

Lastly, the information for providing different control statuses of the vehicle system will be sent to an infotainment system 314. This information is video and/or audio information shown on a display 316 of the vehicle and/or given by loudspeakers.

As mentioned above, the input from at least one of the sensors can be used for transitioning control status between car and driver, as well as driver and car. That is, the vehicle control status is transitioned according to a combination of the obtained driver behavior information, and different possible combinations of sensor input that result in control transitions of the vehicle system.

Table 1 shows the different combinations of the driver behavior information obtained from the sensors. In the table, the detection states of the driver body are in different lines, and if a different detection state occurs for a given period of time, then a transfer of control from the driver to the car or from the car to the driver will occur. A predetermined transfer time of two seconds is used in at least one disclosed embodiment, but in practice the transfer time shall be clearly defined as required. In the following exemplary table, the Initial state of the system is that the driver is in control.

TABLE 1

| Hands on Steering Wheel | Foot on Brake/Gas Pedal | Eyes on Forward Roadway | Control |
|---|---|---|---|
| yes | yes | yes | Driver |
| yes | yes | no | Transferred from Driver to Car |
| yes | no | no | Transferred from Driver to Car |
| no | no | no | Transferred from Driver to Car |
| no | yes | yes | Driver-Lateral is Car |
| no | no | yes | Transferred from Driver to Car |
| no | yes | no | Transferred from Driver to Car |
| yes | no | yes | Driver-Longitudinal is Car |

In Table 1 (first line of the table), it is observed that at the above initial control status, the hands of the driver are on the steering wheel, foot or shoe is on brake/gas pedal, and eyes are toward the forward way From this initial status there are different combinations of sensor states that can happen for different time periods. For example, the control status of the vehicle is transitioned to autonomous control status from driver control status, when the eyes of the driver are not directed towards the forward way of the vehicle.

According to another disclosed embodiment, the initial control status of the vehicle system is under the control of the vehicle, wherein the hands are not on the steering wheel, a foot is not on the brake/gas pedal, or eyes are not towards the forward way as shown in Table 2.

TABLE 2

| Hands on Steering Wheel | Foot on Brake/Gas Pedal | Eyes on Forward Roadway | Control |
| --- | --- | --- | --- |
| no | no | no | Car |
| yes | yes | yes | Transferred from Car to Driver |
| yes | yes | no | Car |
| yes | no | no | Car |
| no | yes | yes | Car-Longitidinal is Driver |
| no | no | yes | Car |
| no | yes | no | Car |
| yes | no | yes | Car-Lateral is Driver |

From Table 2 (second line), it is observed that the vehicle is transitioned to driver control status when the driver behavior information is that the at least one hand of the driver is on the steering wheel, a foot or shoe is on brake or gas pedal, and eyes are directed towards the forward way. It can be seen from Tables 1 and 2, that control of the lateral and longitudinal aspects of the vehicle can be shared between the driver and the car. This sharing is also a function of the combined input from all three sensors. This means sometimes the responsibility for vehicle control is split. For example, "Car-lateral means that the driver is responsible for the lateral control of the vehicle (i.e. steering maneuvers) and the vehicle's DAS system 312 is responsible for longitudinal control (i.e. brake and gas).

According to the above control status transition, when at the initial control status the system is under the control of the vehicle, the vehicle will make all the necessary maneuvers. An important advantage for self-driving vehicles according to at least one disclosed embodiment is that the control status is transitioned in an implicit way, and the driver does not need to make explicit instructions, and the vehicles can behave in an intelligent way. That is, a self-driving vehicle do not need explicit instructions of the driver, and can use its sensory apparatuses and intelligence to avoid obstacles such as other cars, people, structures. The exterior sensor information is sent to the Master controller 303 to evaluate the exterior situation of the surrounding and to determine for example in which direction and of what angle the wheel is to be turned because of a curve. The master controller sends this information to the control unit. The exterior sensors and their connection to the Master controller 303 are not shown in FIG. 3.

Figure 4:
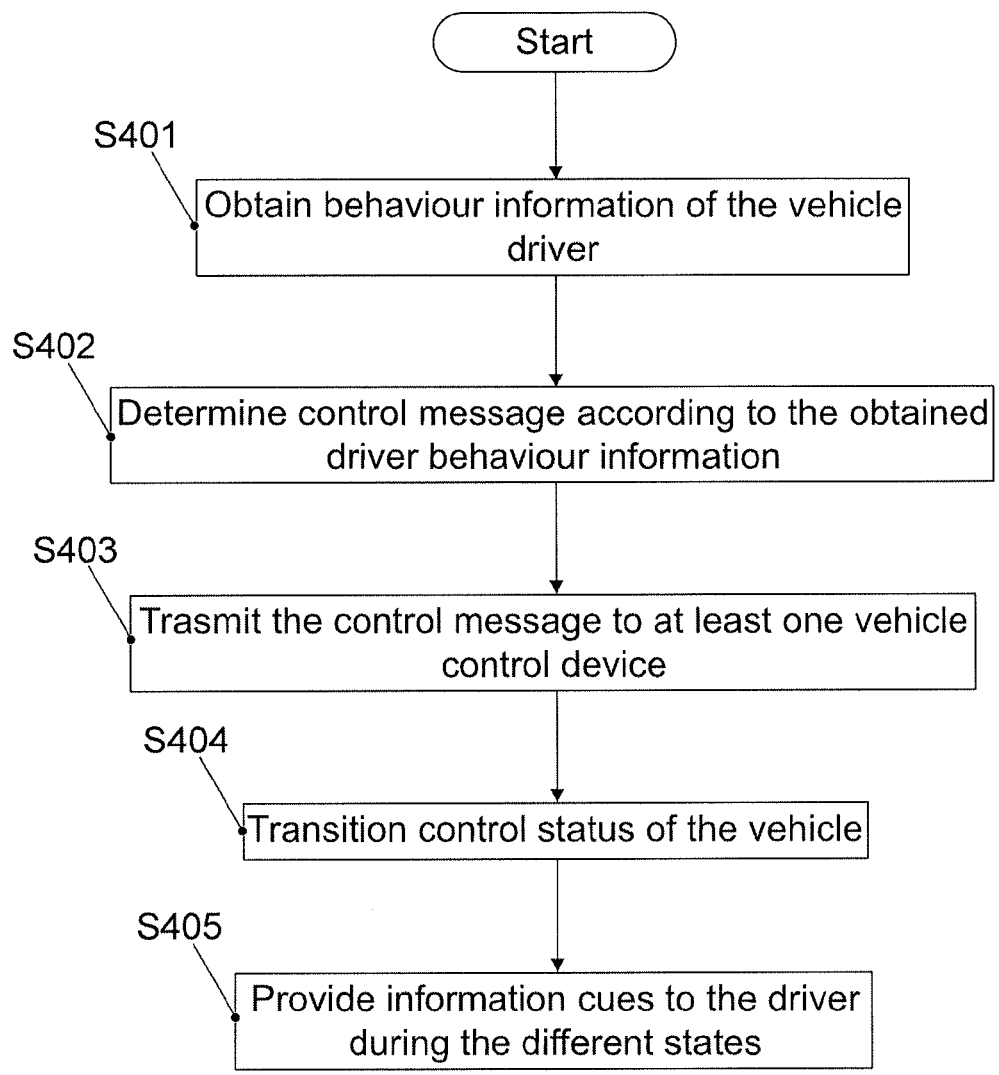
FIG. 4 is a flow chart of the method for controlling the vehicle according to at least one disclosed embodiment.

FIG. 4 is a flow chart of the method for controlling the vehicle according to at least one disclosed embodiment. As shown in FIG. 4, after the controlling procedure is started, for example by starting the car with the key, the behavior information of the vehicle driver will be obtained at step S401. The behavior information comprises driver's body interaction with the vehicle, and driver's body state in the vehicle as mentioned above. Then at step S402, a control message is determined according to the obtained driver behavior information. The control message is determined by the sensor control unit 301 as mentioned above.

Then at step S403 the control message is transmitted to the master controller 303 and with the information of the master controller the control message is transmitted to at least one vehicle control unit, such as the wheel motion controller 305, the wheel actuator 310 and DAS system 312, so that a transition of the control status of the vehicle is reached at step S404. When the control status is transitioned, at step S405 an information cues are provided to the driver during the different states, for example by an enhanced infotainment system 314 for reminding the driver by video and/or audio information.

The foregoing merely illustrates embodiments of the invention and it will thus be appreciated that those skilled in the art will be able to devise numerous alternative arrangements which, although not explicitly described herein, embody the principles of the invention and are within its spirit and scope.

What is claimed is:

1. A method for controlling a vehicle, comprising:
obtaining, via at least one detecting device, behavior information of a driver in the vehicle, wherein the driver behavior information comprises
data relating to a distance of at least one driver's body part relative to a part of the vehicle, and
data relating to an orientation of a driver's body part within the vehicle; and transitioning a control status of the vehicle based on the driver behavior information.

2. The method of claim 1, wherein the control status of the vehicle comprises driver control status, semi-autonomous control status and autonomous control status.

3. The method of claim 1, wherein the transitioning of control statuses comprises controlling at least one vehicle control unit in the vehicle.

4. The method of claim 2, further comprising providing video and/or audio information for the different control statuses to the driver.

5. The method of claim 1, wherein the obtaining of behavior information comprises detecting contact or detecting lack of contact between at least one hand of the driver and a steering wheel of the vehicle.

6. The method of claim 1, wherein the obtaining of behavior information comprises detecting contact or detecting lack of contact between a foot or a shoe of the driver and a brake or gas pedal surface of the vehicle.

7. The method of claim 1, wherein the obtaining of behavior information comprises detecting whether the eyes of the driver are directed toward a forward way of the vehicle.

8. The method of claim 1, wherein the transitioning comprises transitioning the vehicle control status according to a combination of the obtained driver behavior information.

9. The method of claim 1, wherein the transitioning comprises transitioning the vehicle to autonomous control status from driver control status, when the driver behavior information is that the eyes of the driver are not directed toward the forward way of the vehicle.

10. The method of claim 1, wherein the transitioning comprises transitioning the vehicle to driver control status when the driver behavior information is that the at least one hand of the driver is on the steering wheel, foot or shoe is on the brake or gas pedal, and the eyes are directed toward the forward way.

11. A vehicle system in a vehicle for controlling the vehicle status, the system comprising:

at least one detecting device for obtaining behavior information of a driver in the vehicle, wherein the driver behavior information comprises data relating to a distance of a driver's body part relative to a part of the vehicle, and data relating to an orientation of a driver's body part within the vehicle; and a controlling device for transitioning a control status of the vehicle according to the driver behavior information.

12. The vehicle system of claim 11, wherein the control status of the vehicle comprises driver control status, semi-autonomous control status and autonomous control status.

13. The vehicle system of claim 11, wherein the control device comprises a master controller for determining a control message according to the driver behavior information, and at least one vehicle control unit for transitioning the control status according to the control message.

14. The vehicle system of claim 11, wherein the at least one detecting device is adapted to detect contact or lack of contact between at least one hand of the driver and a steering wheel of the vehicle.

15. The vehicle system of claim 11, wherein the at least one detecting device is adapted to detect contact or lack of contact between a foot or a shoe of the driver and a brake or a gas pedal surface of the vehicle.

16. The vehicle system of claim 11, wherein the at least one detecting device is adapted to detect whether the eyes of the driver are directed toward the forward way of the vehicle.

17. The vehicle system of claim 11, wherein the controlling device is adapted to change the vehicle control status based on a combination of the driver behavior information.

18. The vehicle system of claim 11, further comprising an infotainment system for providing information for the different statuses of the system to the driver.

19. A vehicle, comprising a vehicle system for controlling a vehicle status, the system comprising:

at least one detecting device for obtaining behavior information of a driver in the vehicle, wherein the driver behavior information comprises data relating to at least one of a distance of a driver's body part relative to a part of the vehicle, and an orientation of a driver's body part within the vehicle; and a controlling device for transitioning a control status of the vehicle from one status to another according to the driver behavior information, wherein the control status of the vehicle comprises driver control status, semi-autonomous vehicle control status and autonomous vehicle control status.

* * * * *